United States Patent [19]

Crawford, III

[11] 4,353,484

[45] Oct. 12, 1982

[54] COFFEE FILTER WITH FLOW DIVERTER

[76] Inventor: Russell C. Crawford, III, 6991 Juana Dr., Millington, Tenn. 38053

[21] Appl. No.: 129,670

[22] Filed: Mar. 11, 1980

[51] Int. Cl.³ ............................................. B67C 11/00
[52] U.S. Cl. .................................. 222/189; 222/461; 222/478; 222/533; 99/295; 73/863.44
[58] Field of Search ............... 99/295, 304, 305, 306; 222/460, 461, 533, 536, 538, 146 HE, 189, 478; 193/31 A; 73/423 R, 424, 863.44

[56] References Cited

U.S. PATENT DOCUMENTS

| 580,803 | 4/1897 | Rossberg | 73/424 |
|---|---|---|---|
| 3,122,019 | 2/1964 | Wellenius et al. | 73/423 R |
| 3,773,226 | 11/1973 | Kutzer | 222/561 X |
| 3,838,798 | 10/1974 | Voss | 222/603 |
| 3,866,806 | 2/1975 | Shapland, Jr. | 222/600 |
| 3,893,601 | 7/1975 | Winslow | 222/566 |
| 3,970,283 | 7/1976 | Hind | 222/559 X |

FOREIGN PATENT DOCUMENTS

| 831912 | 7/1952 | Fed. Rep. of Germany | 73/423 R |
|---|---|---|---|
| 2732053 | 2/1979 | Fed. Rep. of Germany | 99/295 |
| 849730 | 9/1960 | United Kingdom | 106/58 |
| 873283 | 7/1961 | United Kingdom | 222/591 |

*Primary Examiner*—David A. Scherbel

[57] ABSTRACT

This invention relates to filters for the brewing of coffee. Specifically to the fast brewing drip type suitable for home use. The basis of the invention is in the addition of a diverting valve to allow for the transfer of brewed coffee away from the holding pot and into the users coffee cup. This is to be done without interrupting the brewing cycle or placement of the coffee pot.

1 Claim, 6 Drawing Figures

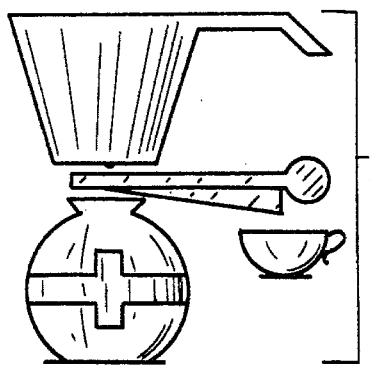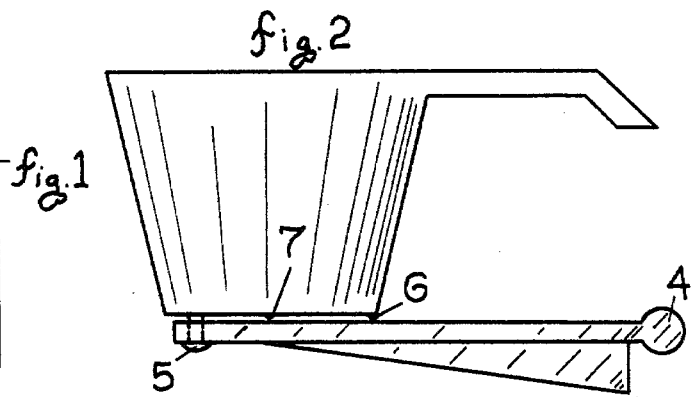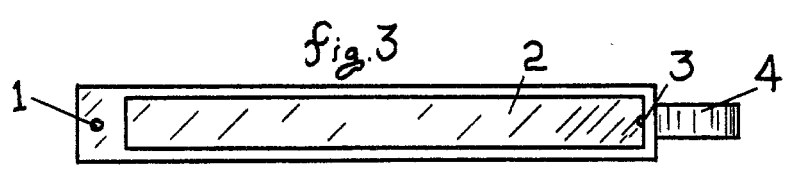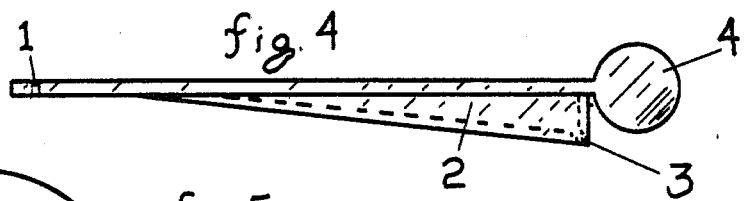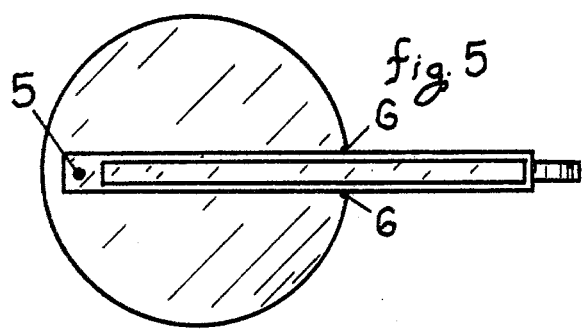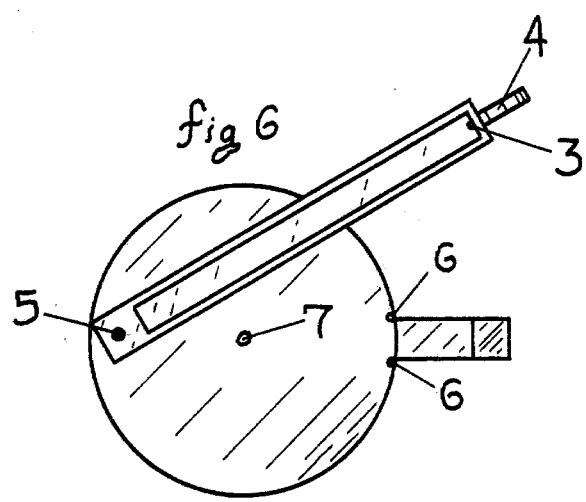

COFFEE FILTER WITH FLOW DIVERTER

BACKGROUND OF THE INVENTION

Prior to this invention coffee filters of the type for individual home us were not equiped with diverting valves for quick removal of brewed coffee. This valve which I deem to be the least costly and easiest to clean in addition to being the most positive action is the only means of obtaining the first or any subsequent cup of coffee from a drip type maker without moving the pot.

SUMMARY OF THE INVENTION

A one piece pivot valve constructed such that a positive snap over locking movement is incorporated in conjunction with a flexiable easily cleaned material. It is constructed in such a way that it can be pivoted out and away from the main body of the filter thereby offering access to cleaning processes.

THE DRAWING

FIG. 1 is a schematic view of the entire device.

FIG. 2 is a side view of the filter and valve.

FIG. 3 is a top view of the valve.

FIG. 4 is a side view of the valve.

FIG. 5 is a bottom view of the moving parts showing the pivot.

FIG. 6 is a partial bottom view showing the valve open.

DESCRIPTION OF THE DRAWING

The coffee filter "a", Has a pivoting valve "b", attached to it with pivoting pin 5, through pivot pin hole 1. The valve consist of valve body "b", transversed by diverting trench 2, originating at a point overlapping outlet 7, and ending at valve outlet 3. In operation, hot coffee dripping from filter output 7, and falling into pot may be diverted into cup "d", by sliding in a horizontal direction the valve pivot lever handle 4, over retaining nob 6. This causes valve body "b", to pop over retaining nob 6, engaging pivot valve "b", and cutting off the coffee flow through hole 7, into pot and causing it to flow through diverting trough 2, toward outlet 3. Diverting trough 2, can be formed to any depth so that outlet 3, is at a convenient distance in heigth from cup "d" when resting in users hand or on a table. After exiting outlet 3, the coffee enters cup "d", held in place by the users hand. When cup "d", is full user moves lever "b" again in a horizontal manner to uncover the filter outlet and resume filling pot "c".

I claim:

1. I claim a coffee filter and flow diverter having a coffee filter for attachment to a drip coffee maker; an outlet in the bottom of the filter; a pivot on the bottom surface of the filter offset from said outlet; a pivoted valve attached to said pivot on said filter; said pivoted valve comprising an elongated upwardly open trough; said trough sloping downwardly from a point near said pivot to the side opposite said pivot and having a trough outlet located at the lowest point of the trough; wherever the trough is pivotable to a position under said filter outlet to divert flow from said filter outlet to a point below the trough outlet.

* * * * *